(12) United States Patent
Hans

(10) Patent No.: US 9,843,674 B2
(45) Date of Patent: Dec. 12, 2017

(54) MANAGING SELECTION AND TRIGGERING OF APPLICATIONS ON A CARD COMPUTING DEVICE

(71) Applicant: Oracle International Corporation, Redwood City, CA (US)

(72) Inventor: Sebastian J. Hans, Berlin (DE)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/495,382

(22) Filed: Sep. 24, 2014

(65) Prior Publication Data
US 2016/0088464 A1 Mar. 24, 2016

(51) Int. Cl.
H04W 8/18 (2009.01)
H04M 3/42 (2006.01)
H04B 1/3816 (2015.01)

(52) U.S. Cl.
CPC ...... *H04M 3/42229* (2013.01); *H04B 1/3816* (2013.01); *H04W 8/183* (2013.01)

(58) Field of Classification Search
USPC ........................................ 455/558, 557, 41.1
See application file for complete search history.

(56) References Cited

U.S. PATENT DOCUMENTS

| | | | | |
|---|---|---|---|---|
| 7,418,620 B1* | 8/2008 | Tormasov | ........... | G06F 11/1076 714/6.24 |
| 7,461,148 B1* | 12/2008 | Beloussov | ............ | G06F 9/5077 703/22 |
| 7,647,589 B1* | 1/2010 | Dobrovolskiy | ..... | G06F 11/3644 710/260 |
| 7,987,432 B1* | 7/2011 | Grechishkin | ......... | G06F 9/4443 715/769 |
| 8,069,218 B1* | 11/2011 | Tormasov | ............. | G06F 9/4856 709/212 |

(Continued)

OTHER PUBLICATIONS

"Multiple Network Operator Services Utilization Using Single SIM Card", N. Mallikharjuna Rao and P. Seetharam, International Journal of Computer Theory and Engineering, vol. 3, No. 3, Jun. 2011, pp. 408-412.

*Primary Examiner* — Edward Urban
*Assistant Examiner* — Ralph H Justus
(74) *Attorney, Agent, or Firm* — Robert C. Kowert; Meyertons, Hood, Kivlin, Kowert & Goetzel, P.C.

(57) ABSTRACT

A card computing device may include and manage multiple virtualized universal integrated circuit cards (UICCs) for use with mobile communications. The card computing device may be capable of storing information, and executing applications, for multiple mobile networks (e.g., using multiple virtual UICCs) and of managing switches among those mobile networks. A mobile network operator (MNO) may be represented by a MNO profile, which, when enabled, may look and behave like a dedicated UICC. One or more applications may be deployed on the card computing device and each may be associated with a MNO profile. When a MNO profile is enabled, one or more applications may be activated and when a MNO profile is disabled, one or more active applications may be deactivated, according to some embodiments. Thus, a card computing device may be configured to activate and deactivate applications as part of managing MNO profiles.

20 Claims, 7 Drawing Sheets

(56) References Cited

U.S. PATENT DOCUMENTS

| | | | | |
|---|---|---|---|---|
| 8,521,084 B2* | 8/2013 | Wane | G06Q 20/32 | 455/41.1 |
| 8,572,370 B1* | 10/2013 | Tormasov | H04L 63/0428 | 709/220 |
| 2002/0019844 A1* | 2/2002 | Kurowski | G06F 9/5072 | 709/201 |
| 2004/0186897 A1* | 9/2004 | Knauerhase | H04L 67/16 | 709/209 |
| 2006/0136990 A1* | 6/2006 | Hinton | H04L 63/0815 | 726/2 |
| 2011/0010543 A1* | 1/2011 | Schmidt | H04W 12/10 | 713/168 |
| 2012/0005237 A1* | 1/2012 | Obata | G06F 9/45537 | 707/798 |
| 2012/0021683 A1* | 1/2012 | Ma | G06Q 20/3278 | 455/41.1 |
| 2013/0104044 A1* | 4/2013 | Gujarathi | G06F 9/4445 | 715/733 |
| 2013/0283047 A1 | 10/2013 | Merrien et al. | | |
| 2013/0344864 A1 | 12/2013 | Park et al. | | |
| 2014/0031012 A1 | 1/2014 | Park et al. | | |
| 2014/0045460 A1 | 2/2014 | Park et al. | | |
| 2014/0134981 A1 | 5/2014 | Park et al. | | |
| 2014/0220952 A1 | 8/2014 | Holtmanns et al. | | |
| 2014/0228039 A1 | 8/2014 | Zhao et al. | | |
| 2015/0281957 A1* | 10/2015 | Hartel | H04M 1/675 | 455/411 |
| 2015/0296369 A1* | 10/2015 | Berionne | H04W 8/183 | 455/418 |

* cited by examiner

MANAGING SELECTION AND TRIGGERING OF APPLICATIONS ON A CARD COMPUTING DEVICE

BACKGROUND

Card computing devices may provide identification, authentication, data storage and application processing in a variety of systems from mobile phones to automated teller machines and drivers licenses. Additionally, card computing devices, such as smartcards, may include various applications that utilize mobile communications, such as credit payment applications, ticketing agents, health/medical agents, encryption agents, and BankID public key infrastructure (PKI) applications.

To operate properly, many mobile devices include information regarding mobile network operator (MNO) subscriptions required for mobile communications. In general, a mobile network is used not only for human communication (e.g., mobile voice calls, text messaging, etc.), but also for Internet-of-Things/Machine-to-Machine (IoT/M2M) communication (e.g., for logistics, fleet management, automotive safety, healthcare, and home electricity metering).

Many mobile phones require a universal integrated circuit card (UICC), embedded universal integrated circuit card (eUICC), or other smart card that includes a Subscriber Identity Module (SIM), or another similar module, to connect to, and function with, a mobile network. A SIM may be considered a logical module that runs on an UICC. The SIM may include identification information and/or credentials, such as the International Mobile Subscriber Identity (IMSI), for authenticating the mobile device (e.g., as a subscriber) to the mobile network. Without the SIM the mobile device may not be able to connect to the mobile network. Traditionally, a UICC was able removable, such as to allow a mobile subscriber to move a SIM from one device to another. A mobile device user may have been able to change mobile devices by removing the SIM card from one mobile device and inserting it into another mobile device. Alternatively, a user might use the same mobile device with different SIMs, such as to reduce roaming costs when using a mobile phone in a different country.

Various specifications and standards define interfaces and protocols for use with mobile communication enabled card computing devices. For example, the European Telecommunications Standards Institute (ETSI) and the International Standards Organization along with the International Electrotechnical Commission (ISO/IEC) have defined protocols and specifications relating to the communication between an application on a card computing device and a terminal application. Object oriented platform independent languages, such as Java, have become common development platforms for creating applications for card computing devices. For instance, Java Card™ is a small Java implementation for embedded devices including card computing devices.

SUMMARY

A card computing device, such as an embedded universal integrated circuit card (eUICC), may include and manage multiple virtualized universal integrated circuit cards (UICCs) for use with mobile communications, such as in Internet-of-Things/Machine-to-Machine (IoT/M2M) devices as well as in mobile consumer devices. In some embodiments, a card computing device (e.g., a eUICC) may be capable of storing information, and executing applications, for multiple mobile networks (e.g., using multiple virtual UICCs) and of managing switches among those mobile networks. A mobile network operator (MNO) may be represented by a MNO profile, which, when enabled, may look and behave like a dedicated UICC. One or more applications may be deployed on the card computing device and each may be associated with (e.g., deployed as part of) a MNO profile. Additionally, one or more applications may be installed at the platform level rather than being associated with any particular profile. When a MNO profile is enabled, one or more applications may be activated and when a MNO profile is disabled, one or more active applications may be deactivated, according to some embodiments. Thus, a card computing device may be configured to activate and deactivate applications as part of managing MNO profiles.

Figure 1:
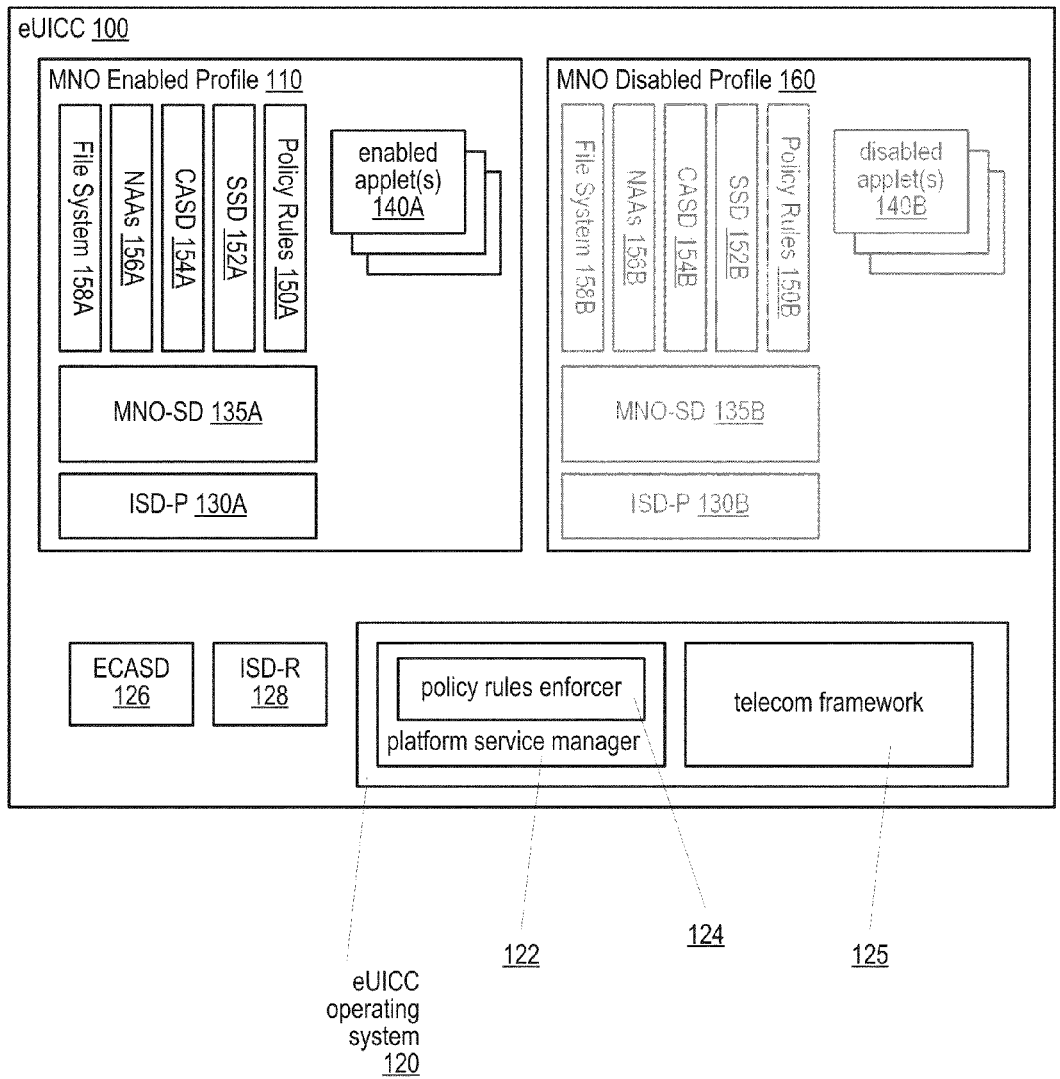
FIG. 1 is a block diagram illustrating one example of a card computing device configured to manage multiple MNO profiles, as described herein.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, a card computing device, such as an embedded universal integrated circuit card (eUICC), may include and manage multiple virtualized universal integrated circuit cards (UICCs) for use with mobile communications, such as in Internet-of-Things/Machine-to-Machine (IoT/M2M) devices as well as in mobile consumer devices. For example, some mobile phones may require a Subscriber Identity Module (SIM), to connect to, and function with, a mobile network (managed by a mobile network operator, or MNO). Various types of identity modules, such as Subscriber Identity Module (SIM), the Universal Subscriber Identity Module (USIM), IP Multimedia Services Identity Module (ISIM), and/or Code division multiple access (CDMA) Subscriber Identity Module (CSIM), may be used in various types of devices for connecting with different networks, according to various embodiments. For example, a SIM may be used to connect to a 2G network, while a USIM may be used to connect to a 3G network. Similarly, an ISIM may be used in conjunction with the IP Multimedia Subsystem (IMS) and a CSIM may be used with $3^{rd}$ Generation Partnership Project 2 (3GPP2) networks, in some embodiments. In some embodiments, a SIM, USIM, ISIM, CSIM or other identity module may be, or may be considered, a logical component or application on a UICC or eUICC. Note that for ease of explanation and discussion, the terms Universal integrated circuit card (UICC) and Subscriber Identity Module (SIM) may be used herein to refer to any and/or all such modules.

The SIM may include identification information and/or credentials, such as the International Mobile Subscriber Identity (IMSI), for authenticating the mobile phone (e.g., the subscriber) to the mobile network.

In some embodiments, a card computing device (e.g., eUICC) may be capable of storing information, and executing applications, for multiple mobile networks (e.g., using multiple virtual UICCs) and of managing switches among those mobile networks. For example, in some embodiments, a mobile network operator (MNO) may be represented by a MNO profile (e.g., a virtual UICC) on the eUICC. From the point of view of a terminal or the over-the-air (OTA) infrastructure of a MNO, a profile may look and behave like a dedicated UICC. For example, in some embodiments, any existing command may work in the same manner with a currently enabled MNO profile on a eUICC as it did on a dedicated UICC. Additionally, remote management of the content of a MNO profile may be performed as for a dedicated UICC, but with a scope restricted to a single MNO profile (e.g., a profile context).

Similarly, there may be no additional restrictions (e.g., in terms of application features and/or behavior of security domains) within a eUICC as compared to a dedicated UICC. In other words, even though a eUICC may include multiple profiles, for different MNOs, when a MNO profile is enabled, the enabled profile (and the eUICC) may appear (and function) as a single, dedicated, UICC. Thus, external devices, modules and/or systems (e.g., a terminal or host) designed to communicate and/or cooperate with a eUICC may be able to communicate and/or cooperate with the enabled profile of a eUICC in the same manner (e.g., without modification).

In some embodiments, a card computing device, such as a eUICC, may be configured to communicate over a terminal interface and may further be configured to communicate with external modules, devices and/or services, such as a terminal or host, via any of various card-reading mechanisms, devices and/or interfaces. For example, in some embodiments, the card computing device may include one or more contact pads that may be used as a communications medium between the card computing device and a host or terminal. In other embodiments, a card computing device may be, or include, a contactless communication interface configured to communicate with a terminal (or other module/device) via radio waves.

When communicating with a host or terminal, the card computing device may be configured to use any of various communications protocols, according to various embodiments. For example, in one embodiment, the card computing device may be configured to use the ISO/IEC 7816 communications standard and to exchange pairs of application protocol data unit (APDU) messages with the terminal (or an application executing on the terminal). The eUICC 100 may receive command APDUs from the terminal while sending response APDUs in return. APDUs may include various fields. For example, a command APDU may include a header and from 0-255 bytes of data while a response APDU may include a status word and from 0-255 bytes of data, according to some embodiments.

Additionally, in some embodiments, messages (e.g., ADPUs) exchanged between the card computing device and a terminal may be used within other communications protocols. For example, the European Telecommunications Standards Institute (ETSI) has defined a secure channel mechanism to communicate between an application (e.g., executing on a eUICC) and a terminal application where the command and responses (command APDU and Response APDU according to ISO 7816) may be encapsulated within dedicated transaction commands. Thus, in some embodiments, the European Telecommunications Standards Institute (ETSI) protocol may be supported by a runtime component of the card computing device.

When a MNO profile is enabled, one or more applications may be activated and when a MNO profile is disabled, one or more active applications may be deactivated, according to some embodiments. Thus, a eUICC may be configured to activate and deactivate applications as part of managing MNO profiles.

FIG. 1 is a block diagram illustrating one example card computing device configured to manage multiple MNO profiles, as described herein. As shown in FIG. 1, a card computing device, such as eUICC 100, may include an operating system 120, as well as multiple MNO profiles, such as MNO enabled profile 110 and MNO disabled profile 160. Note that while only two profiles are illustrated in FIG. 1, a eUICC may include more profiles in some embodiments. The eUICC operating system 120 may include one or more modules or components, such as platform service manager 122, policy rules enforcer 124 and/or telecom framework 125, that may be configured to support management and execution of applications and/or MNO profiles.

A card computing device, such as eUICC 100, may include one or more security domains at the platform level, such as eUICC controlling authority security domain (EC-ASD) 126 and issuer security domain root (ISD-R) 128, as well as one or more security domains at the profile level, such as issuer security domain profile (ISD-P) 130A and 130B, mobile network operator security domain (MNO-SD) 135A and 135B, secondary security domain 152A and 152B, controlling authority security domain 154A and 154B, that may be part of any or all MNO profiles on the eUICC, according to some embodiments. In general a security domain (whether at the platform or profile level) can be considered a module or component that provides (or supports) secure functionality (e.g., encryption key management) between the eUICC and one or more external organizations (e.g., the MNO, a payment service, a bank, an authentication service, etc.). As also shown in FIG. 1, a MNO profile may include various additional components or modules, such as enabled applets 140A, disabled applets 140B, policy rules 150A and 150B, network access application(s) 156A and 156B, and/or a file system 158A and 158B, according to some embodiments.

In various embodiments, eUICC 100 may be, or be part of, various card computing devices, such as (but not be limited to) credit cards, automated teller machine (ATM)

cards, mobile phone subscriber identity module (SIM) cards, drivers licenses, authorization cards for pay television, pre-payment cards, high-security identification cards, access control cards and telephone call payment cards. In addition, the eUICC 100 (or a card computing device including eUICC 100) may be configured for use as an electronic wallet, such as by recording and managing one or more financial accounts. While described mainly in terms of non-removable devices, such as an embedded SIM card, trusted platform module (TPM), and/or other embedded universal integrated circuit card, the methods and/or techniques described herein also apply to removable card computing devices, such as traditional SIM cards, ATM cards, payment authorization cards, and/or other card computing devices or universal integrated circuit cards.

A card computing device, such as eUICC 100, may be configured to store and execute one or more applications, such as enabled applets 140A and disabled applets 140B, via an operating system or runtime environment, such virtualized eUICC operating system 120. For example, in one embodiment, a card computing device may be configured to store and execute a Java based runtime environment and Java applets, such as may be developed according to the Java Card™ specifications. Additionally, in some embodiments, other modules shown in FIG. 1 may also be developed as applications. For instance, in one embodiment, MNO-SD 135A, MNO-SD 135B, ISD-P 130A and ISD-P 130B may be developed as applications, such as Java based applets.

As used herein, Java Card™ may refer to technology that allows Java-based applications (e.g., applets) to be executed on a card computing device. In some embodiments, a Java Card™ based card computing device may include a combination of a virtual machine (e.g., Java Card™ Virtual Machine or Java Card™ VM) and a runtime library as well as one or more applets. In some embodiments, a card computing device may be configured to execute a Java Card™ Runtime Environment (JCRE) with one or more modules capable of managing multiple MNO profiles, as well as activating and/or deactivating one or more applications as part of switching profiles, as described herein. In some embodiments, eUICC operating system 120 may represent a Java Card™ Virtual Machine implementation executing on a card computing device.

As illustrated in FIG. 1, a the card computing device, such as eUICC 100, may be configured to host a virtualized execution environment, such as eUICC operating system 120 that may include a platform services manager 122, policy rules enforcer 124 and/or a telecom framework 125. As noted above, in some embodiments, eUICC operating system 120, as shown in FIG. 1, may represent a Java Card™ based virtualized environment, may include, or be based on, the Java Card™ Runtime Environment (JCRE). The eUICC operating system 120 (and any included components) may be considered the core platform of the card computing device, and may be referred to herein as the card computing device platform or the eUICC platform.

In general, eUICC operating system 120 may be configured to execute one or more applications and may be responsible for supporting and managing various functions and features performed by the eUICC while providing device-level functionality to support the execution of applications. For example, the virtualized execution environment may provide an Application Programming Interface (API) allowing applications to access device-level (and/or system-level) functionality. Additionally, a virtualized execution environment may provide functionality for managing (e.g., loading, installing, and/or removing) applications.

In some embodiments, eUICC operating system 120 may be configured to manage multiple MNO profiles stored on the eUICC and to provide platform (e.g., card-level) support for applications (e.g., applets 140A and 140B) deployed to individual profiles. The eUICC operating system may, in some embodiments, be configured to communicate and coordinate with one or more external modules, systems or devices (such as a terminal or host) and to provide mechanisms by which profiles (e.g., applications deployed to a profile) may communicate (or otherwise interact) with other modules, systems and/or devices (whether part of, or external to, the eUICC).

Supporting multiple mobile networks on a single card computing device, such as eUICC 100, may involve changes to a core eUICC platform configured to manage and execute applications on the eUICC. For instance, applications may, in some embodiments, be managed, deployed and/or executed, within the scope of a logical construct called a "profile" rather than within a per card scope (as was traditionally done). In other words, applications may be deployed, managed and/or executed on a profile-by-profile basis and not necessarily on a card-by-card basis. For example, in one embodiment, a Java Card™ based eUICC platform, such as eUICC operating system 120, may be used to host, manage and/or execute one or more Java applets, such as applets 140A and 140B. The core Java Card™ platform (and possibly external Java APIs) may be configured to allow the management of deployed applets within the scope of a profile, such as profiles 110 and 160, rather than within card-level scope. Thus, applets may be deployed and managed on profile-by-profile basis and not necessarily on a card-by-card basis.

Please note, however, that some applications may be deployed within a platform- or card-level scope, while other applications may be deployed within a profile-level scope (e.g., instead of, or in addition to, a card-level scope), according to some embodiments. Additionally, in some embodiments, the same application may be associated with, and deployed in, multiple profiles on the same eUICC (even though only one may be active at any one time). In some embodiments, some applications (e.g., platform service manager 122 or telecom framework 125) may be deployed within a platform-level scope, while others may be deployed within a profile-level scope (e.g., applets 140A and 140B).

In some embodiments, a card computing device, such as eUICC 100, may include multiple MNO profiles and may be configured to load and dynamically update MNO subscriptions. Note that the terms profile and MNO profile may be used interchangeable herein. An operating system on the eUICC may be configured to manage the multiple profiles on the eUICC in order to allow different profiles to be enabled at different times (e.g., an active profile may be disabled and a different profile may be enabled). For instance, in one embodiment a mobile phone may include an embedded (e.g., non-removable) SIM (as one example of a eUICC) which may include two (or more) profiles for different mobile networks. An operating system on the eUICC (such as Java Card™ Runtime Environment) may be configured to manage the profiles on the SIM. In one embodiment, a profile may be enabled, then disabled and a different profile enabled as individual entities. For instance, the user of the mobile phone may use one profile in order to utilize one mobile network in one country while using another profile to utilize a different mobile network in another country.

Individual profiles may be enabled or disabled and a eUICC platform may be configured to host several profiles at the same time, but only one of the profiles may be active (and providing the normal UICC services) at any one time. In some embodiments, the eUICC platform may be considered, and used as, a default profile.

Additionally, one or more applications may be deployed on the card computing device and each may be associated with (e.g., deployed as part of) a MNO profile. Thus, multiple applications may be associated with a profile and may need to be activated (e.g., executed or enabled) when that profile is enabled and deactivated when that profile is disabled. Furthermore, the eUICC may include one or more applications that are not associated with a profile (e.g., applications at a platform context) and they may not be deactivated when a profile is disabled. In general, profiles may be isolated from each other, such that applications with the same application ID (AID) may be deployed to different profiles, according to some embodiments.

Additionally, other types of identifiers may be assigned to applications. For example, in some embodiments, each application may be assigned a toolkit application reference (TAR) value. A TAR value may be a three byte value that may be used by a toolkit protocol to identify the application in secure short messaging service (SMS) communications, in one embodiment. Additionally, different TAR values (and/or ranges of TAR values) may be used for different types of applications. For example, standardized TAR values may be assigned to management applications, while other types of TAR values may be used for mobile payment, according to some embodiments. Multiple TAR values may be assigned to a single application, such as to provide logical separation between different functions. Furthermore, in some embodiments, different applications may be assigned the same TAR value, such as to have two different applications in two different profiles have the same TAR value.

In some embodiments, the card computing device (e.g., eUICC 100) may be part of a larger device (e.g., a mobile phone) that may include one or more systems, modules and/or features that may also need to be reconfigured when one profile is disabled and another is enabled (e.g., during a profile switch). For example, one or more menu items of the mobile phone may be changed based on which profile is current enabled. Similarly, different events may be required by different profiles.

Figure 2:
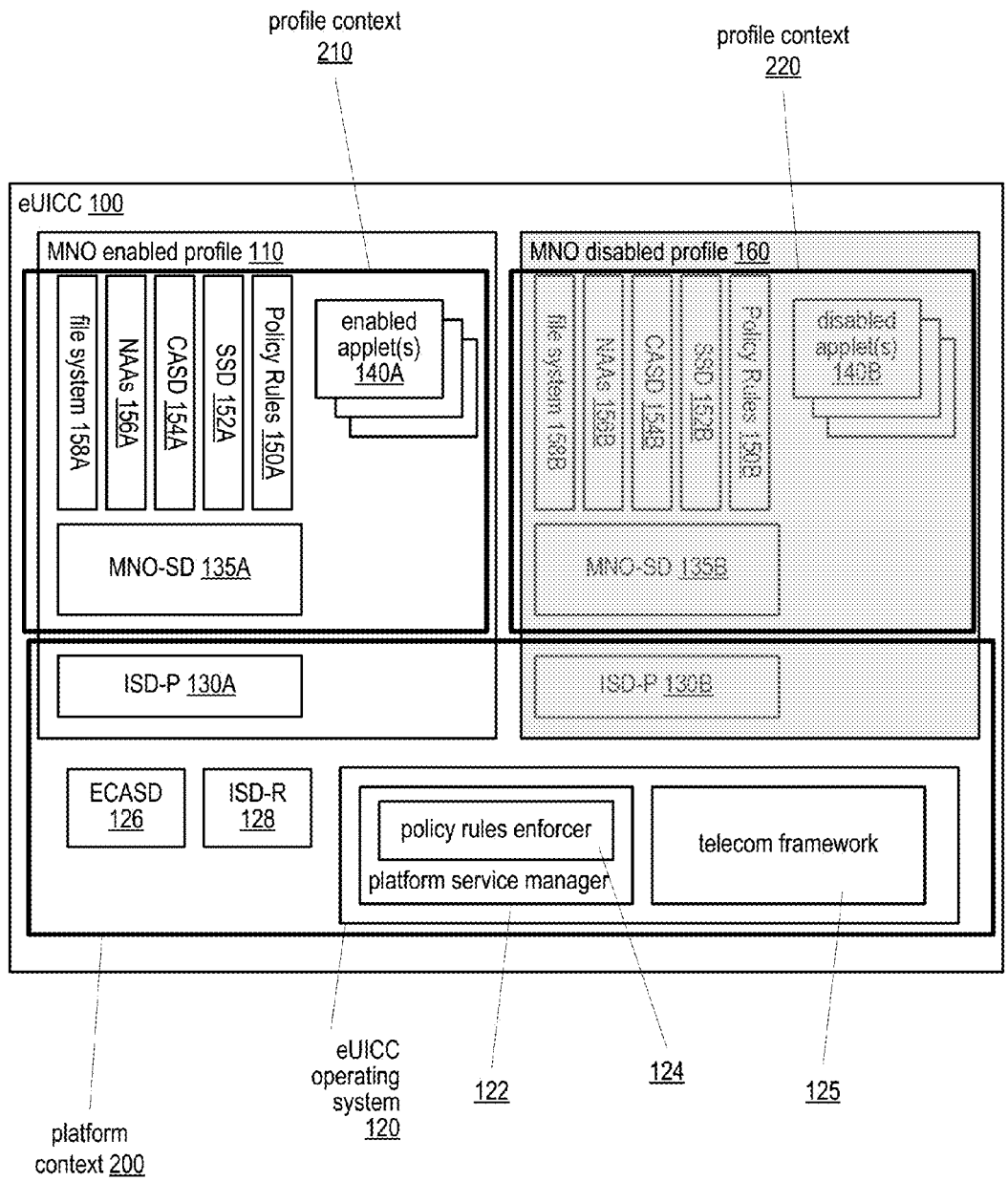
FIG. 2 is a logical block diagram illustrating different contexts within an example card computing device, according to one embodiment as described herein.

FIG. 2 is a logical block diagram illustrating different contexts within an example card computing device, according to one embodiment as described herein. As shown in FIG. 2, eUICC 100 may be considered to include multiple different contexts, such as platform context 200, profile context 210 and profile context 220. In some embodiments, the different contexts utilized with eUICC 100 may define logical divisions between functionality performed as part of the eUICC platform and functionality performed as part of an individual profile. In the example embodiment illustrated in FIG. 2, platform context 200 may include eUICC operating system 120 (including operating system components platform service manager 122, policy rules enforcer 124 and telecom framework 125), ECASD 126, ISD-R 128 and one or more ISD-P 130 (e.g., ISD-P 130A and 130B).

In general, platform context 200 may include any (of all) applications/modules/components of eUICC that are not part of a particular profile. Additionally, eUICC 100 may include one or more profile contexts, such as profile context 210 and profile context 220. In some embodiments, a eUICC may include one profile context per profile. In general, a profile context may include any (or all) applications/modules/components part of, or deployed to, a particular profile on eUICC 100. For instance, in the example embodiment shown in FIG. 2, profile context 210 may include various applications/modules/components of MNO enabled profile 110, such as MNO-ISD 135A, policy rules 150A, SSD 152A, enabled applet(s) 140A, CASD 154A, NAA(s) 156A and/or file system 159A. Similarly, profile context 220 may include various applications/modules/components of MNO disabled profile 160, such as MNO-ISD 135B, policy rules 150B, SSD 152B, disabled applet(s) 140B, CASD 154B, NAA(s) 156B and/or file system 159B.

Applications and packages deployed to platform context 200 may be shared across all profiles, while applications and packages deployed to profile context 210 or profile context 220 may only be shared within the respective profile, according to some embodiments. Additionally, in some embodiments, application identifiers (AIDs) may be unique within particular contexts. For instance, AIDs for packages and/or applications deployed to platform context 200 may be unique within platform context 200 while AID's for packages and/or applications deployed to a particular profile context may be unique within that profile context.

In some embodiments, applications may not be able to access information regarding applications associated with a different profile (e.g., in a different profile context), but all application may be able to access information in the platform context. For example, in a Java Card™ based eUICC, applets deployed to a particular profile may be able to invoke methods exposed by a shareable interface from applets that are deployed to the same profile, and may also be able to invoke methods of a shareable interface from the platform context, but may not be able to invoke methods of the Shareable Interface from applets that are also deployed to a different profile. For instance, according to one embodiment, enabled applet(s) 140A may be able to invoke methods via a shareable interface for another applet within profile context 210 and/or within platform context 200, but may not be able to discover shareable interfaces for applets within profile context 220.

In other words, core packages deployed to the platform context may be referenced by packages deployed to a particular profile context. Applications in the platform context may only be able to invoke methods of the shareable interface from applets that are also deployed to the currently enabled profile, according to some embodiments.

Thus, in some embodiments, applications installed on the eUICC may be managed at a profile-level scope (e.g., profile context) rather than at a platform-level scope (e.g., platform context). For example, in a Java Card™ based eUICC, Java Card™ applets may be associated with individual profiles. Profile-level applications (e.g., applets deployed to a profile context) may be activated when an associated profile is enabled and deactivated when the associated profile is disabled, according to some embodiments.

Additionally, a card computing device, such as eUICC 100, may include applications that are deployed (e.g., activated) at a platform context rather than at a profile context. In some embodiments, core applications and/or packages (e.g., that may be shared across the entire eUICC) may be deployed (e.g., activated) to a platform context, such as platform context 200. For example, the platform context may be used for applications and packages of the platform environment (e.g., eUICC operating system 120) itself as well as other higher-level defined packages (e.g., Global-Platform and/or ETSI/3GPP defined packages). Applications in the platform context may be configured to manage the platform and the multiple profiles of the card computing device. For instance, in some embodiments, platform context applications may be configured to allow remote management of the card computing device (as a eUICC platform) and to enable new profiles to be downloaded. Furthermore, the eUICC platform (or a platform context application) may be configured to manage the switching of profiles (e.g., disabling the current profile and enabling a different profile).

In some embodiments, applications (e.g., Java Card™ applets) developed for use with dedicated UICCs may be deployed on a eUICC platform (e.g., a Java Card™ platform) that includes multiple profiles. Such applications may not require any modification work with the eUICC and the fact that the eUICC includes and can manage multiple profiles may be transparent to the individual applications. Additionally, existing devices, module and/or systems configured to interact with dedicated UICCs may also be able to interact with (the enabled profile on) a eUICC that includes multiple profiles. For example, terminal hardware and over-the-air (OTA) management systems of an MNO may be able to interact with a Java Card™ platform for a eUICC without any change. In other words, a eUICC configured to maintain and manage multiple profiles may be backwards compatible with existing hardware and systems, according to some embodiments.

When managing multiple profiles, a card computing device platform, such as eUICC operating system 120, may be configured to associate various applications and/or application resources with particular profiles. For example, a Java Card™ Runtime Environment (JCRE) based eUICC platform, may be configured to manage load files, packages and applet instances according to the respective profiles to which they are deployed. In one embodiment, load files, packages and applet instances may be associated with an identifier for the profile to which they belong (e.g. their profile context). Note, in some embodiments, there may not be an actual, separate, identifier used to associate load files, packages and applet instances with their associated profile. Instead, the associated between load files, packages, and/or applet instances may be defined when they are loaded (or installed), such as via commands sent to the particular Security Domain. In some embodiments, package AID and/or applet names may be applicable to the profile context rather than to the entire card computing device.

Additionally, packages, applet classes and applet instances may not be unique for the entire card computing device, but instead may be unique for a particular context on the card computing device, according to some embodiments. In other words, two packages or applications using the same AID may be deployed to different profiles (e.g., since only one will be active at any one time).

Additionally, the card computing device platform may be configured to keep track of which applications (e.g., applets) are not associated with a particular profile (e.g., platform-level applications). Packages, applet classes, and applet instances may be managed according to the particular context to which they are deployed and instantiated.

Figure 3:
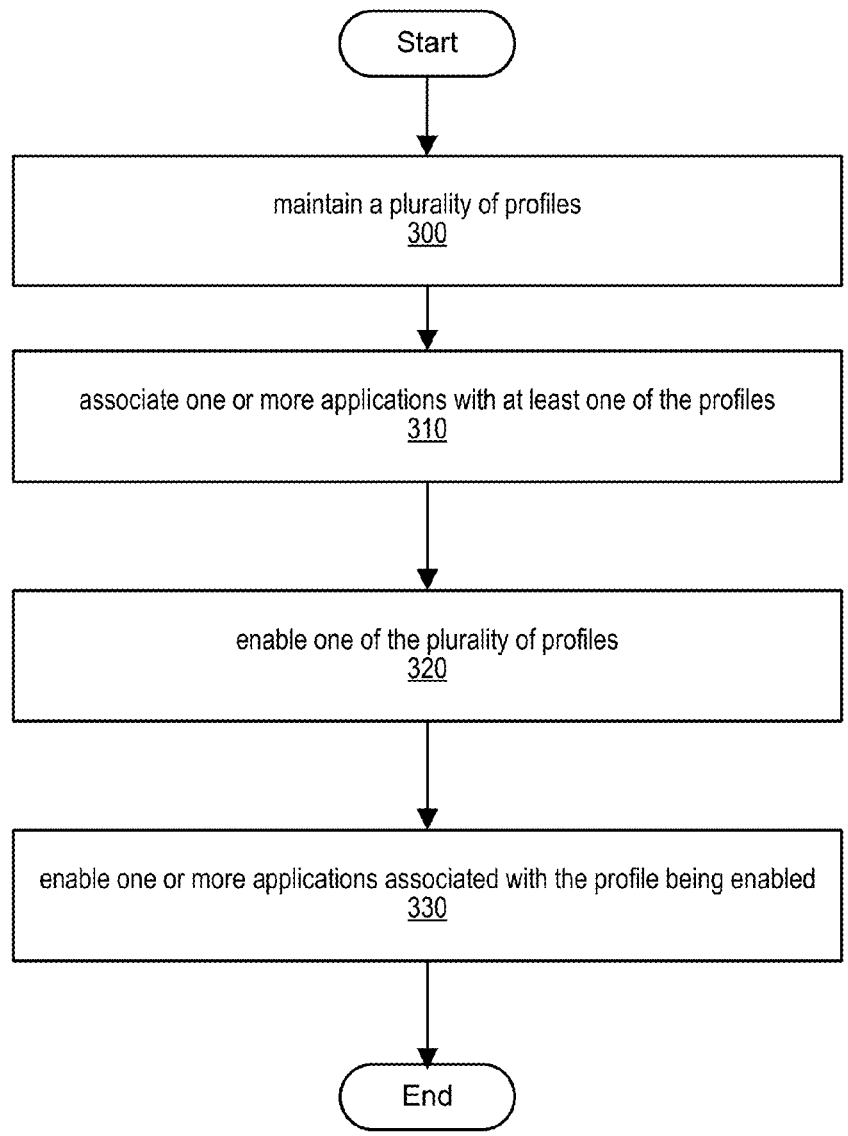
FIG. 3 is a flowchart illustrating one embodiment of a method for managing multiple profiles on a card computing device, as described herein.

As described above, a card computing device platform, such as eUICC operating system 120, may be configured to manage the switching between two different profiles. FIG. 3 is a flowchart illustrating one embodiment of a method for managing multiple profiles on a card computing device, as described herein. As illustrated by block 300, a card computing device platform may be configured to maintain a plurality of profiles, as described above. For example, eUICC operating system 120 may be configured to maintain MNO platforms 110 and 160, according to one embodiment. Profiles may be installed on a eUICC in any of various ways, according to various embodiments.

For instance, profiles may be installed to the card computing device as part of the initial loading and setup of the card computing device. In other embodiments, a new profile including one or more applications may be downloaded to (and/or installed on) a card computing device. The profile and applications may be downloaded together or separately, according to various embodiments. For example, a MNO may provide a service via which a new subscriber can obtain and download a profile for that MNO, such as to allow a mobile phone to communicate via mobile network provided by that MNO.

The applications may be registered with the eUICC platform and one or more entries (e.g., regarding menu entries, events, polling intervals, etc.) may be included in the registry but no enabled. Subsequently, when the new profile is enabled, the applications may also be enabled and consequently the entries in the registry may be marked as enabled and/or published, as described below.

As part of maintaining multiple profiles, a eUICC platform may be configured to associate one or more applications with at least one of the profiles, as shown by block 310. For example, a MNO may update or improve their service and may provide a new or different application to subscribers that supports the updated or improved service, according to one example embodiment.

As described above, when enabling a profile, as shown by block 320, the card computing device platform may also enable one or more applications associated with the profile being enabled, as shown by block 330. Thus, when a new profile is downloaded (or otherwise obtained), one or more applications may be associated with the profile and if the new profile is enabled, the applications associated with it may also be enabled, as described in more detail below.

When enabling (or activating) applications as part of enabling a profile, the card computing device platform may execute each application associated with the profile being enabled. Additionally, the card computing device platform may be configured to provide functionality allowing an application being enabled to register, reserve or other allocate one or more resources such as menu entries, events, timers, etc., as will be discuss in more detail below. Additionally, as noted above, the card computing device platform may manage the activated applications within a profile context associated with the enabled profile.

Figure 4:
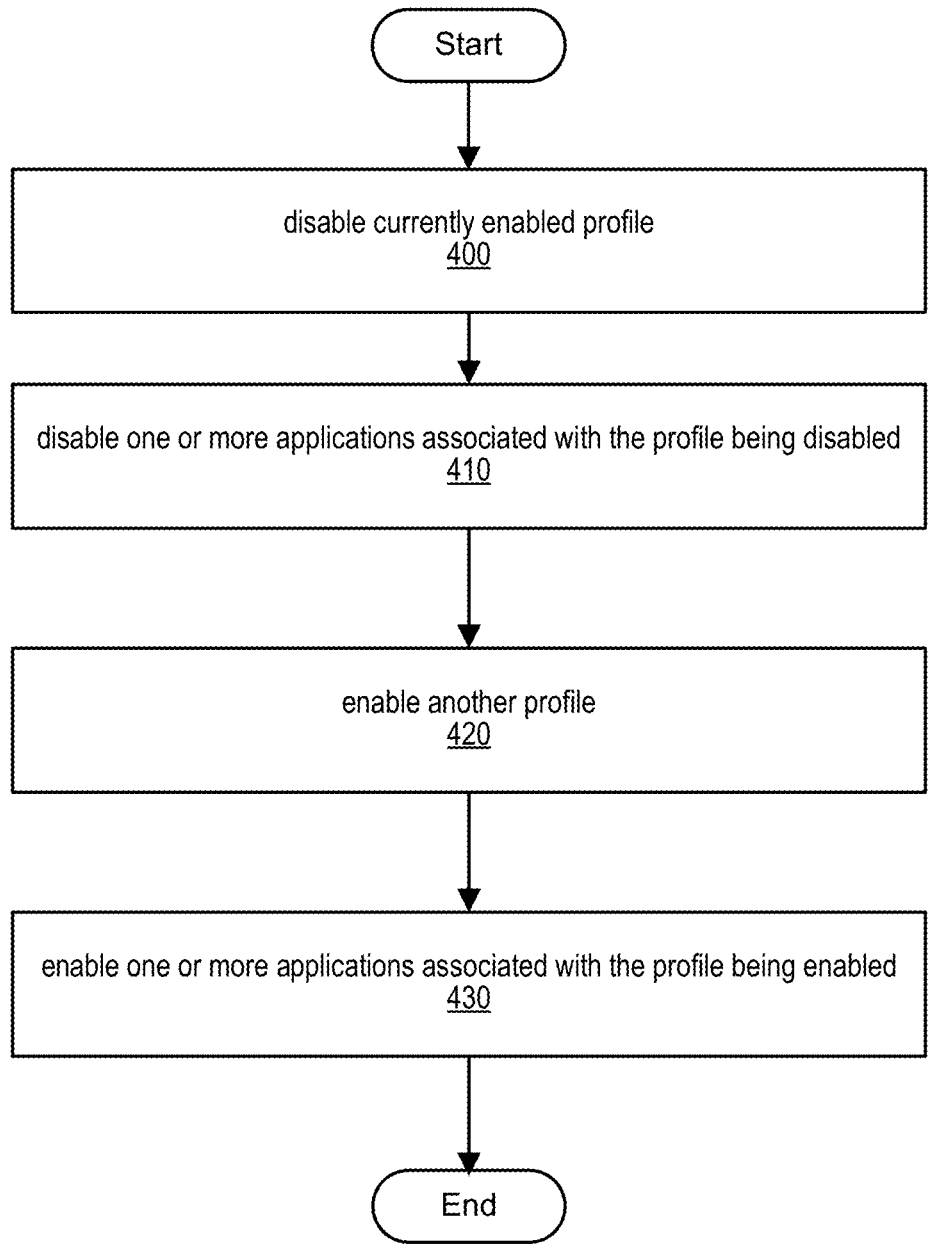
FIG. 4 is a flowchart illustrating one embodiment of a method for managing a profile switch, as described herein.

A card computing device platform may also be configured to manage a profile switch in which an active profile is disabled and another profile is enabled. FIG. 4 is a flowchart illustrating one embodiment of a method for managing a profile switch, as described herein. As shown in block 400, as part of managing a profile switch, a eUICC platform, such as eUICC operating system 120, may be configured to disable a currently enable profile. As noted above, in some embodiments only a single profile may be enabled at any one time. Thus in order to enable a different profile, such as to enable a mobile phone to communicate over a different mobile network, the eUICC platform may disable the currently active profile.

As part of disabling the active profile, the eUICC platform may disable one or more applications associated with the profile being disabled, as illustrated in block 410. For example, referring back to FIG. 2, when disabling MNO enabled profile 110, eUICC operating system 120 may be configured to disable each of enabled applet(s) 140A. In some embodiments, disabling an application, such as one of enabled applet(s) 140A, may involve shutting down the application and removing the application from memory. In other embodiments, however, disabling an application may involve putting the application into a disabled state without actually removing the application from memory (e.g. suspending the application). In general the exact nature of how an application is disabled may vary from embodiment to embodiment.

As will be discussed in more detail below, in some embodiments, disabling an application may involve de-allocating one or more resources that the application had allocated previously, such as menu entries, events, timers, etc.

Returning now to FIG. 4, as part of a profile switch, a card computing device platform may be configured to enable another profile, as shown in block 420 and may also enable one or more applications associated with the profile being enabled, as in block 430. As described above, when enabling (or activating) applications as part of enabling a profile, the card computing device platform may execute each application associated with the profile being enabled, according to some embodiments. In other embodiments, enabling an application may involve re-enabling an application that was disabled previously but not removed from memory (e.g., resuming a suspended application). Additionally, the card computing device platform may be configured to support an application being enabled to register, reserve or other allocate one or more resources such as menu entries, events, timers, etc., as will be discuss in more detail below.

Furthermore, each application (e.g., applet) and any unique identifiers, telecom event registrations, and/or contactless interface features for that application, may have to be activated (e.g., configured) whenever the respective applications associated profile is enabled and deactivated whenever that profile is disabled, thus preventing applets of a disabled profile from interacting with the terminal, the mobile network and/or the contactless interface.

As noted above when a currently-enabled profile is disabled, the card computing device platform (e.g., eUICC operating system 120 or the JCRE) may disable all the applications associated with that profile (applications with that profile context). In addition, the card computing device platform may be configured to de-allocate one or more resources that had been previously allocated by, or to, applications associated with the profile being disabled. For example, the card computing device platform may be configured to disable one or more resourced by updating entries in a registry.

Figure 5:
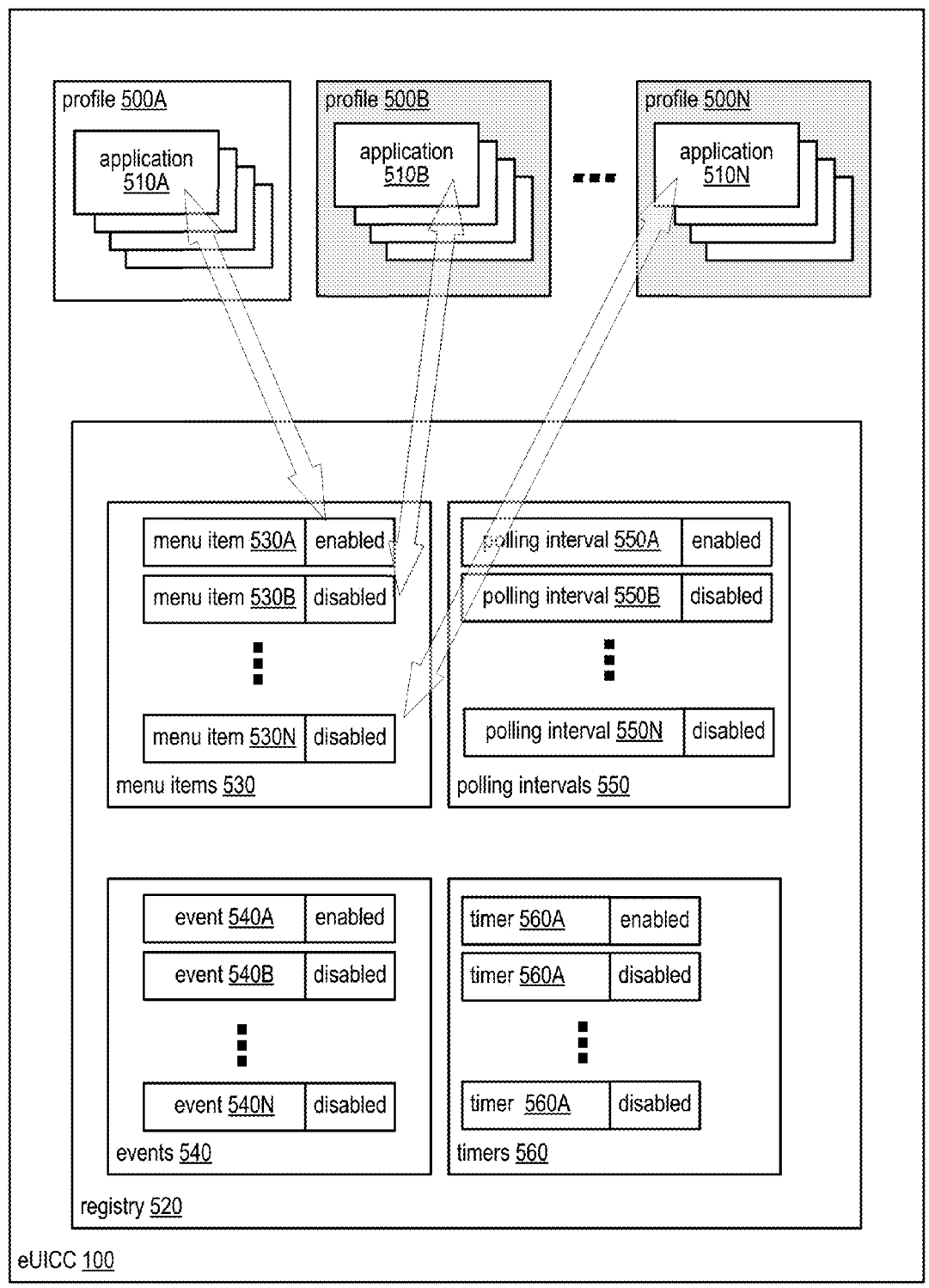
FIG. 5 is a logical block diagram illustrating one example of modifying registry entries as part of a profile switch, according to one embodiment.

FIG. 5 is a logical block diagram illustrating one example of modifying registry entries as part of a profile switch, according to one embodiment. For example, eUICC 100 may include a registry 520 configured for storing (and communicating) information about resource allocated to (or reserved by) applications, such as menu entries, events, timers, polling intervals, etc. For instance, registry 520 may include one or more menu items 530, one or more events 540, one or more polling intervals 550 and one or more timers 560, according to one example embodiment. Please note that the use of menu items, events, polling intervals and timers in FIG. 5 is merely one example, and in general more, fewer or different types of resources may be managed by a eUICC platform as part of managing a profile switch, according to different embodiments.

Thus, in some embodiments, the card computing device platform may be configured to modify (e.g., to disable) one or more registry entries for resource allocated to applications when disabling a profile. While in some embodiments, the registry entries may be deleted, in other embodiments, the applications' actual entries may remain present in the registry, but may be marked as deactivated or inactive. For example, as shown in FIG. 5, menu item 530A may be associated with (e.g., allocated by) application 510A, which may be part of currently enabled profile 500A. Thus, menu item 530A may be marked as enabled. Menu items 530B and 530N may be marked as disabled since they may be associated with (e.g., allocated by) applications 510B and 510N, which are associated with currently disable profiles 500B and 500N.

When disabling profile 500A, eUICC operating system 120 may be configured to update entries in registry 520 to reflect the fact that certain resources are no longer allocated to an enabled applications (e.g., to de-allocate those resources). Thus, eUICC operating system 120 may modify the registry entry for menu item 530A to be disabled instead of enabled. When a new profile is enabled, the eUICC platform (e.g., JCRE) may activate the applications for the new profile and may activate any registry entries for the applications. For instance, if profile 500B was being enabled (after disabling profile 500A), eUICC operating system 120 may modify the registry entry for menu item 530B to be enabled instead of disabled, according to one example embodiment.

Similarly, the registry entries for events 540A-N, polling intervals 550A-550N and timers 560A-560N may be updated when the respective applications to which they are allocated are enabled or disabled as part of a profile switch.

When an application is being activated (e.g., when its associated profile is being enabled) it may register itself with the eUICC platform and may allocate one or more resources (e.g., menu entries, events, polling intervals, timers, etc.). In response, the eUICC platform may create or update entries in registry 520 to reflect the resources allocated to the application.

In some embodiments, applications may register themselves with the eUICC platform and/or the registry during application installation even if the particular profile with which the application is associated is not current enabled. In such situations, registry entries for the applications may be included in registry 520, but may not be enabled (until and unless the associated profile enabled).

Figure 6:
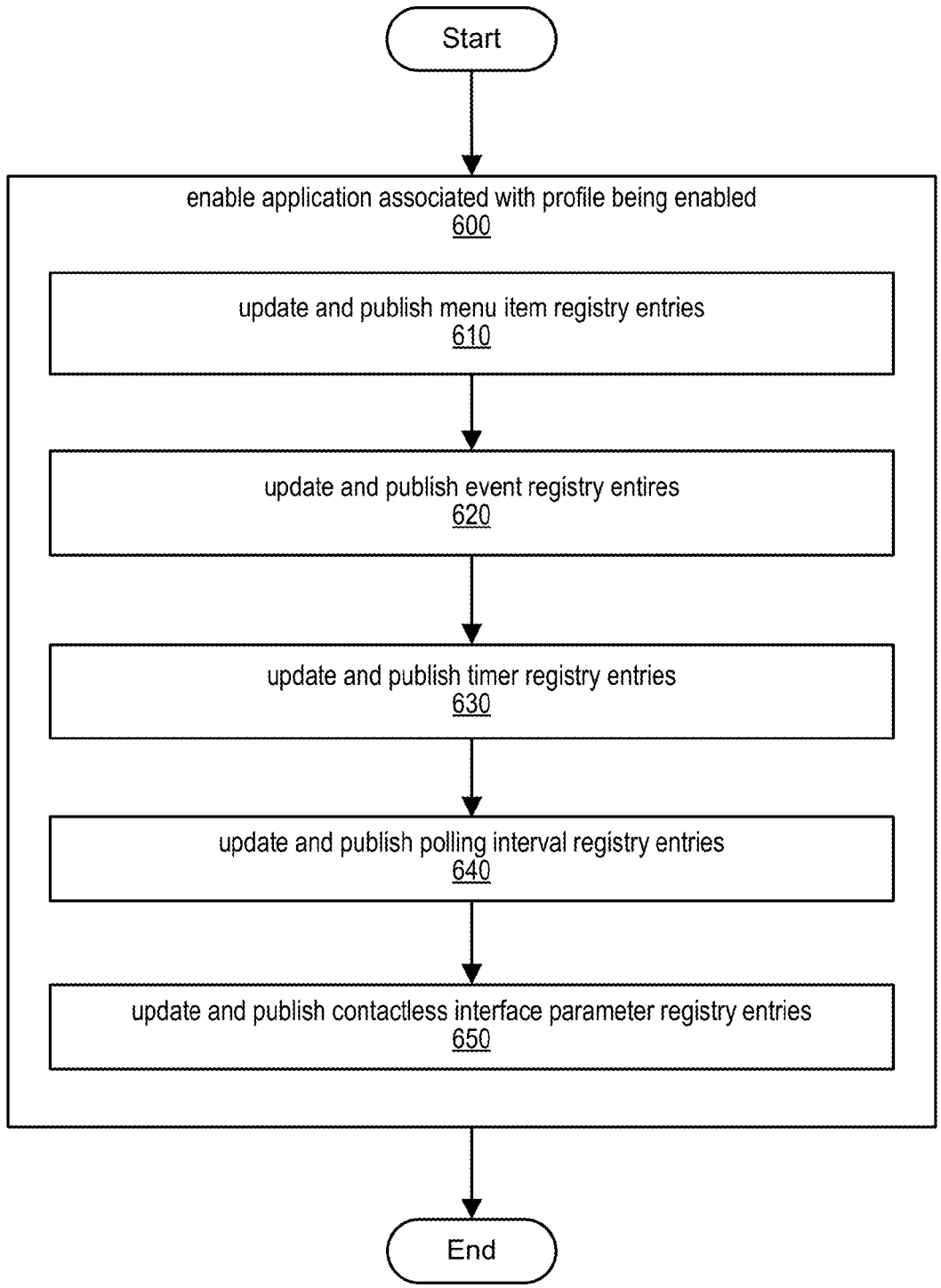
FIG. 6 is a flowchart illustrating one embodiment of a method for enabling an application as part of a profile switch, as described herein.

In some embodiment, the eUICC platform may issue one or more proactive commands to publish entries in the registry, such as to allow other devices, modules and/or systems (such as the terminal or host) to discover information about resources allocated to enabled applications (e.g., menu entries, events, timers, polling intervals, etc.). FIG. 6 is a flowchart illustrating one embodiment of a method for enabling an application as part of a profile switch, as described herein.

As part of enabling an application associated with a profile being enabled, as illustrate by block 600, the eUICC platform may be configured to update and publish menu item registry entries, as shown in block 610. In some embodiments, when a profile is being enabled (e.g., activated), the eUICC platform may be configured to determine (e.g., via registrations by applications) one or more menu entries that need to be enabled (e.g., at the terminal) for the application being activated. As described above, the eUICC platform may enable one or more menu items 530 in registry 520 for the application.

When publishing information about resources allocated to applications being enabled as part of a profile switch, the eUICC platform may, in some embodiments, send a command (or multiple commands) to another module, device or system (e.g., the terminal or host) including information regarding the resources being allocated to or requested by applications being enabled.

The eUICC platform may send different commands for different resources. For instance, in one embodiment, the eUICC platform may send one command for menu items and another command for events. According to some embodiments, the eUICC platform may send individual commands for each application being activated, while in other embodiments, a single command may include information regarding all the menu entries for multiple applications being activated. Similarly the exact nature and number of commands that may be sent regarding events (e.g., registrations) may vary from embodiment to embodiment. If a user subsequently selects one of the menu entries or one of the events occurs, the other module, system or device (e.g., the terminal) may send a message to the eUICC platform and the platform may forward the information to the application responsible for that particular menu entry or event. The application may then handle the menu selection or event appropriately.

In some embodiments, two different applications (e.g., one enabled and one disabled) may both allocate (and be configured to handle) the same event. This event may be registered once for each application. When this event occurs, the eUICC platform may have to ensure that only the application in the currently enabled profile (and/or an application at the platform context) is triggered to handle the event, according to some embodiments.

Thus, as noted above, when a profile is being enabled (e.g., activated), the eUICC platform may be configured to determine (e.g., via registrations by applications) one or more menu entries that need to be enabled (e.g., at the terminal) for multiple applications being activated and communicate those menu entries to the appropriate module, system or device (e.g., the terminal). In some embodiments, the eUICC may collect all the menu entries for all the applications being activated and may send a command (e.g., to the terminal) including information on all the collected menu entries.

For instance, in a Java Card™ based eUICC platform, the JCRE may be configured to build a "menu entry list" based on registration information from one or more applets associated with the currently active profile (e.g., profile being enabled), as well as from applets deployed outside the profile (e.g., applets in the platform context). This "menu entry list" may be included in, or referenced by, the JCRE when invoking a Setup Menu command (e.g., a command to notify another module, device or system about menu entries to be enabled). In some embodiments, the eUICC platform may have to issue a Setup Menu command every time a profile switch occurs.

In other embodiments, however, a eUICC platform may send multiple commands (e.g., one command per activated application). In general, the number and formatting of commands used to communicate menu entries for applications being activated may vary from embodiment to embodiment.

The eUICC platform may also be configured to update and publish event registry entries, as shown in block 620. In some embodiments, when a profile is being enabled (e.g., activated), the eUICC platform may be configured to determine (e.g., via registrations by applications) one or more event entries that need to be enabled (e.g., at the terminal) for the application being activated. As described above, the eUICC platform may enable one or more event entries 540 in registry 520 for the application.

As noted above, in some embodiments, when a profile is being enabled (e.g., activated), the eUICC platform may be configured to determine (e.g., via registrations by applications) one or more events that need to be enabled (e.g., at the terminal) for one or more applications being activated and communicate those events to the appropriate module, system or device (e.g., the terminal). In some embodiments, the eUICC may collect all the events for all the applications being activated and may send a command (e.g., to the terminal) including information on all the collected events.

For instance, in a Java Card™ based eUICC platform, the JCRE may be configured to build an "event list" based on registration information from one or more applets associated with the currently active profile (e.g., profile being enabled), as well as from applets deployed outside the profile (e.g., applets in the platform context). This "event list" may be included in, or referenced by, the JCRE when invoking a Setup Events List command (e.g., a command to notify another module, device or system about events to be enabled). In some embodiments, the eUICC platform may have to issue a Setup Events List command every time a profile switch occurs.

In other embodiments, however, a eUICC platform may send multiple commands (e.g., one command per activated application). In general, the number and formatting of commands used to communicate events for applications being activated may vary from embodiment to embodiment.

In some embodiments, the eUICC may be able to issue these menu entry and/or event commands to the terminal at any time (e.g. after reset of the eUICC, or when an application is deregistered as part of a profile switch or deletion).

The eUICC platform may also send a command to the appropriate module, system or device (e.g., the terminal) including information regarding menu entries and/or events that should no longer enabled, such as when one or more applications are deactivated as part of a profile switch.

In some embodiments, certain events, such as the "call control" event may only be registered (and/or allocated) to a single application instance on the eUICC at any one time. On the eUICC, such events may have to be assigned only to applications that registered for the particular event (e.g., the call control event) in the currently active profile context. If a profile switch occurs, the application currently registered for the particular event (e.g., the call control event) may be deregistered and a different application (e.g., part of the newly enabled profile context) may become active and registered for the event. For instance, it may not be possible for an application in the currently active profile context and an application outside that profile context (even in the platform context) to both be registered for this event.

Thus, in some embodiments, the eUICC platform may be configured to support applications utilizing resources for which there may only be a limited number, such as the call control event described above. For example, an application on a eUICC may be able to allocate Bearer Independent Protocol (BIP) channels on a module, service and/or device (e.g., the terminal) external to the eUICC. However, there may only be a fixed number of BIP channels that may be allocated to a eUICC, according to some embodiments. For example, in one embodiment, the terminal may include one or more BIP channels as resources which applications (e.g., Java Card™ applets) may allocate. Every BIP channel allocated by an application may be assigned a unique ID usable by the eUICC platform to bind the BIP channel to the particular application instance.

Because BIP channels may be limited in number it may be important that they are released when the corresponding application is deactivated (e.g., as part of a profile switch). Thus, in some embodiments, the eUICC platform may de-allocate a BIP channel, such as by issuing a de-allocate BIP channel command for all BIP channels allocated by applications when the profile associated with those applications is disabled. In some embodiments, the eUICC platform may de-allocate BIP channels as each application is deactivated, while in other embodiments, the eUICC platform may de-allocate all BIP channels allocated by applications of a particular profile context when that profile is disabled (e.g., before all the associated applications have been deactivated). If the same profile is subsequently enabled again, the same BIP channels may be allocated again by the associated applications as they become activated, according to some embodiments.

Thus, in some embodiments, a eUICC platform may disable, but not delete, information indicating the binding between a BIP channel and a particular application so that if the application is activated subsequently (e.g., when the application's profile context is re-enabled) the BIP channel binding may be re-enabled. However, in some embodiments, even if an application is re-activated as part of a subsequent profile switch, the eUICC platform may still issue BIP channel allocation commands in order to allocate BIP channels resources for the application as part of the subsequent profile switch.

Additionally, a eUICC may include features that may be restricted such that only one application may use (or manage) that feature at a time, such as acting in reader mode over HCI or being registered to handle Call Control). In some embodiments, therefore, the eUICC platform may be configured to manage which application has (or may manage) certain features on a per-profile scope (such as via registry entries, etc.).

Returning now to FIG. 6, the eUICC platform may also be configured to update and publish timer registry entries, as shown in block 630. In some embodiments, when a profile is being enabled (e.g., activated), the eUICC platform may be configured to determine (e.g., via registrations by applications) one or more timer entries that need to be enabled (e.g., at the terminal) for the application being activated. As described above, the eUICC platform may enable one or more timer entries 560 in registry 520 for the application.

In some embodiments, an application on a eUICC may be able to allocate a timer on a module, service and/or device (e.g., the terminal) external to the eUICC. However, there may only be a fixed number of timers that may be allocated to a eUICC, according to some embodiments. For example, in one embodiment, the terminal may include one or more timers as resources which applications (e.g., Java Card™ applets) may allocate. Every timer allocated by an application may be assigned a unique ID usable by the eUICC platform to bind the timer to the particular application instance. Thus, when the timer expires (e.g., when a specific amount of time has passed), an event including the timer's ID may be sent to the eUICC and the eUICC platform may inform the application that is bound to the timer. In response the application may perform one or more commands, actions or other functionality.

Because timers may be limited in number it may be important that they are released when the corresponding application is deactivated (e.g., as part of a profile switch). Thus, in some embodiments, the eUICC platform may de-allocate a timer, such as by issuing a de-allocate time command for all timers allocated by applications when the profile associated with those applications is disabled. In some embodiments, the eUICC platform may de-allocate timers as each application is deactivated, while in other embodiments, the eUICC platform may de-allocate all timers allocated by applications of a particular profile context when that profile is disabled (e.g., before all the associated applications have been deactivated). If the same profile is subsequently enabled again, the same timers may be allocated again by the associated applications as they become activated, according to some embodiments.

Thus, in some embodiments, a eUICC platform may disable, but not delete, information indicating the binding between a timer and a particular application so that if the application is activated subsequently (e.g., when the application's profile context is re-enabled) the timer binding may be re-enabled. However, in some embodiments, even if an application is re-activated as part of a subsequent profile switch, the eUICC platform may still issue timer allocation commands in order to allocate timer resources for the application as part of the subsequent profile switch.

The eUICC platform may also be configured to update and publish polling interval registry entries, as shown in block 620. In some embodiments, when a profile is being enabled (e.g., activated), the eUICC platform may be configured to determine (e.g., via registrations by applications) one or more polling interval entries that need to be enabled (e.g., at the terminal) for the application being activated. As described above, the eUICC platform may enable one or more polling interval entries 550 in registry 520 for the application.

In some embodiments, a eUICC may be configured to establish a polling interval at which another module, system or device (e.g., the terminal) may send a specific command to the eUICC at a particular interval (e.g., the polling interval). For example, this may enable applications in the eUICC to issue a command or perform other actions. In some embodiments, a default polling interval (e.g., 30 seconds) may be used, while applications may be able to register shorter or longer polling intervals via the eUICC platform. In some embodiments, only a single polling interval may be available for a eUICC and therefore the eUICC platform may use the shortest application-registered interval as the polling interval.

Additionally, polling may incur extra resource costs, such as execution, battery life and/or other resources both on the eUICC and on the polling module, system or device (e.g., the terminal), according to some embodiments. Thus, in some embodiments, a profile may not require any polling and therefore no polling interval may be registered by applications associated with that profile. Consequently, in some embodiments, the eUICC platform may not communicate any polling interval (or alternatively may communicate the fact that no polling interval is required) to the other module, system or device (e.g., the terminal).

As with menu entries and events, discussed above, the eUICC platform may issue one or more poll interval commands during a profile switch. For instance, in some embodiments, when a currently active profile is disabled, the eUICC platform may issue a polling interval command specifying no polling interval (or otherwise disable polling). Similarly, when a profile is enabled, a eUICC platform may issue a polling interval command indicating a new polling interval, such as after applications for the newly activated profile (and any newly activated applications at the platform-context) have registered their desired polling interval.

The eUICC platform may also be configured to update and publish contactless interface parameter registry entries, as shown in block 620. In some embodiments, when a profile is being enabled (e.g., activated), the eUICC platform may be configured to determine (e.g., via registrations by applications) one or more contactless interface parameter entries that need to be enabled (e.g., at the terminal) for the application being activated. While not illustrated in the example embodiment illustrated in FIG. 5, in some embodiments, registry 520 may include one or more entries regarding contactless interface parameters requested by applications and the eUICC platform may enable one or more contactless interface parameter entries for the application.

For example, in some embodiments, one or more applications may communicate over a contactless interface. When switching profiles, the eUICC platform may be configured to disable one or more registry entries regarding the contactless interface for applications that are be disabled and enable one or more registry entries regarding the contactless interface for applications being enabled with the newly activated profile. For instance, in one embodiment, a JCRE may issue a command of a Host Controller Interface (HCI) link to the Near Field Communications (NFC) frontend chip to publish contactless parameters for a newly activated application. Similarly, a JCRE may publish (such as via the HCI link to the NFC) Proximity Payment System Environment (PPSE) parameters regarding a newly activated application, such as to enable payment in an EMVco compliant environment. EMVco may be considered a standard managed by the public corporation defining and managing the Europay, Mastercard and Visa global standard for interoperation of integrated circuit cards and IC Card capable point of sale terminals and automated teller machines for authenticated credit and debit card transactions.

Figure 7:
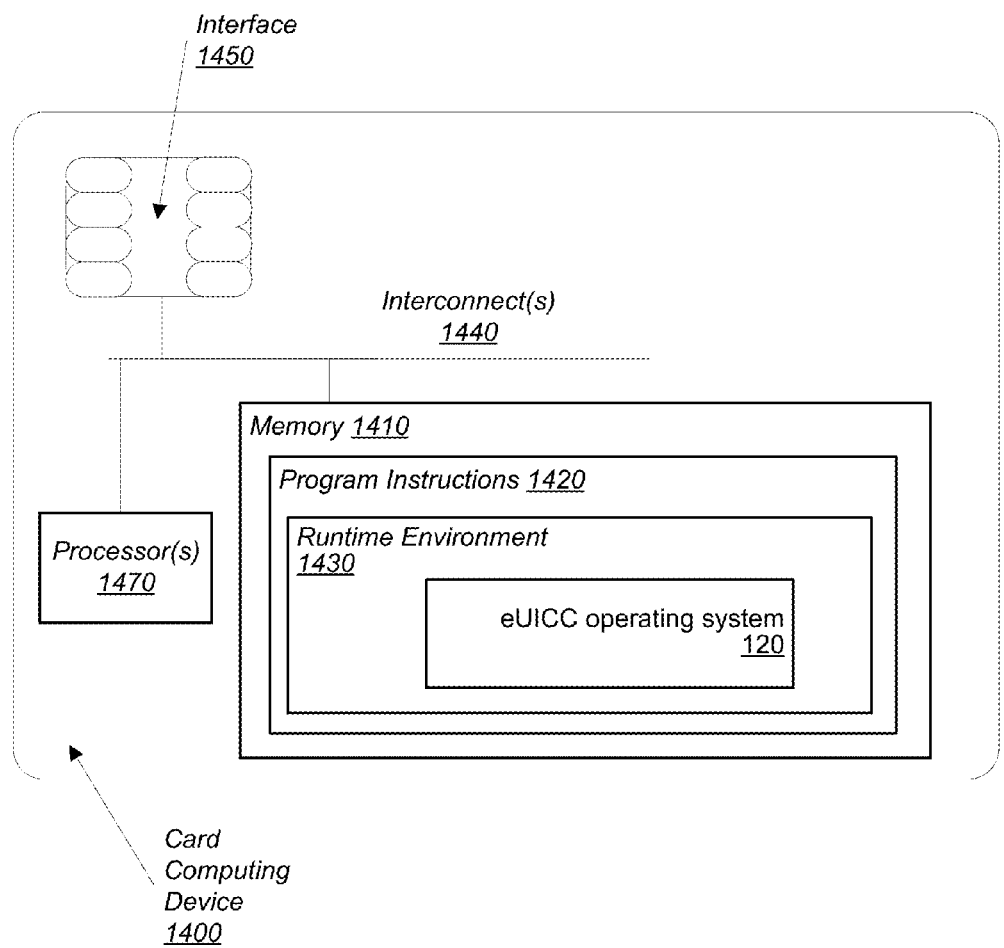
FIG. 7 is a block diagram illustrating one embodiment of a card computing device configured to manage multiple profiles eUICC, as described herein.

The techniques described herein for managing multiple MNO profiles on a eUICC may be implemented in any of a wide variety of computing systems. FIG. 7 illustrates a card computing device configured to manage multiple MNO profiles, as described herein and according to various embodiments. In some embodiments, card computing device 1400 may be same as, or include eUICC 100, described above.

In some embodiments, card computing device 1400 may be any of various types of pocket-sized cards with embedded integrated circuits, including, but not limited to a smart card, a chip card, an integrated circuit card (ICC), or an embedded universal integrated circuit cards (eUICC), credit card, automated teller machine (ATM) card, mobile phone subscriber identity module (SIM) card, authorization card for pay television, pre-payment card, high-security identification card, access control card and telephone call payment card. Card computing device 1400 may be configured for use in various roles in any of various systems, such as to support or provide mobile communications, identification, authentication, data storage and/or application processing.

As described herein, card computing device 1400 may be configured to communicate with external devices and services via any of various card-reading devices and/or interfaces. For example, in some embodiments, card computing device 1400 may include one or more terminal interfaces 1450. In some embodiments, terminal interface 1450 may be a communications medium between the card computing device and a host or terminal for the card computing device. Terminal interface 1450 may be configured to communicate according to any of various protocols, including but not limited to Single Wire Protocol (SWP) and Host Controller Interface (HCI) specifications.

In some embodiments, terminal interface 1450 may include a contact area comprising several electrically conductive contact pads which may provide electrical connectivity when inserted into a terminal, host or other card reader.

In other embodiments, terminal interface 1450 may comprise a contactless communication device configured to communicate with a terminal via radio waves.

While described herein mainly in reference to smaller, (e.g., pocket-sized) integrated circuit cards, the methods and techniques described herein may also be performed on other computing devices. Thus, in some embodiments, card computing device 1400 may be any of various types of devices, including, but not limited to, a mobile phone, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software, that may include a non-transitory, computer-readable storage medium having stored thereon instructions, which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., hard disk drive or floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A card computing device 1400 may include a processor unit 1470 (possibly including an integrated circuit, a self-programmable one-chip microcomputer (SPOM), multiple processors, a single-threaded processor, a multi-threaded processor, a multi-core processor, etc.) which may be configured to execute a runtime environment, such as runtime environment 1430 including one or more components or applications, such as eUICC operating system 120, which may be present within program instructions 1420 stored in memory 1410 of the same card computing device 1400 on which runtime environment 1430 is executed or may be present within program instructions stored within a memory of another computer system similar to or different from card computing device 1400.

The card computing device 1400 may include one or more system memories 1410 (e.g., one or more of cache, SRAM DRAM, RDRAM, EDO RAM, DDR RAM, SDRAM, Rambus RAM, EEPROM, etc.) which may be mutable or immutable, a system interconnect 1440 (e.g., LDT, PCI, ISA, etc.), and a terminal interface 1450 (e.g., an ATM interface, an Ethernet interface, a Frame Relay interface, etc. The memory medium may include other types of memory as well, or combinations thereof. In other embodiments, card computing device 1400 may include more, fewer, or different components than those illustrated in FIG. 7. The processor(s) 1470, the terminal interface 1450 and the system memory 1410 may be coupled to the system interconnect 1440.

One or more of the system memories 1410 may include program instructions 1420 configured to implement some or all of the techniques described herein for establishing and managing secure channel communications (according to any of the embodiments described herein). For example, one or more of the system memories 1410 may include code to implement and/or execute runtime environment 1430 and/or eUICC operating system 120, according to one embodiment.

In various embodiments, program instructions 1420, runtime environment 1430, eUICC operating system 120, and/or individual sub-modules of these components may each be implemented in any of various programming languages or methods. For example, in one embodiment, eUICC operating system 120 may be JAVA based, while in another embodiment, it may be written using the C or C++ programming languages. Similarly, runtime environment 1430 may be written using Java, C, C++, or another programming language, according to various embodiments. Moreover, in some embodiments, runtime environment 1430, eUICC operating system 120, and various sub-modules of these components may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
a card computing device configured to store a plurality of profiles, wherein each profile represents a subscriber identity module for a mobile network operator of a mobile network; and
wherein the card computing device comprises a virtualized execution environment, wherein the virtualized execution environment is configured to execute a plurality of applications written in a platform independent object oriented language, wherein individual ones of the plurality of applications are associated with respective profiles of the plurality of profiles;
wherein the virtualized execution environment is further configured to:
disable an active one of the plurality of profiles;
disable one or more applications associated with the disabled profile, wherein after being disabled, the one or more applications associated with the disabled profile are prevented from interacting with the respective mobile network;
enable a different one of the plurality of profiles; and
enable one or more of the plurality of applications associated with the enabled profile.

2. The system of claim 1, further comprising a mobile phone, wherein the mobile phone comprises the card computing device, and wherein each of the plurality of profiles comprises a mobile communications profile associated with a mobile communications network.

3. The system of claim 2, wherein the card computing device is a subscriber identity module for the mobile phone.

4. The system of claim 1, further comprising a registry configured to store information regarding the plurality of applications, wherein to enable the one or more applications associated with the enabled profile the virtualized execution environment is further configured to enable one or more entries for the enabled applications in the registry.

5. The system of claim 4, wherein to enable the one or more entries for the enabled applications in the registry the virtualized execution environment is further configured to publish the enabled entries to one or more other modules or services of the system.

6. The system of claim 4, wherein to enable the one or more entries for the enabled applications in the registry the virtualized execution environment is further configured to enable, in the registry, one or more menu entries for the enabled applications.

7. The system of claim 4, wherein to enable the one or more entries for the enabled applications in the registry the virtualized execution environment is further configured to enable, in the registry, one or more application events for the enabled applications.

8. The system of claim 4, wherein to enable the one or more entries for the enabled applications in the registry the virtualized execution environment is further configured to enable, in the registry, one or more polling intervals for the enabled applications.

9. The system of claim 4, further comprising the registry configured to store information regarding the plurality of applications, wherein to disable the one or more applications associated with the disabled profile the virtualized execution environment is further configured to disable one or more entries for the one or more disabled applications in the registry.

10. A method, comprising:
maintaining, by a virtualized execution environment on a card computing device, a plurality of profiles, wherein each profile represents a subscriber identity module for a mobile network operator of a mobile network, wherein the virtualized execution environment is configured to execute a plurality of applications written in a platform independent object oriented language, wherein individual ones of the plurality of applications are associated with respective profiles of the plurality of profiles;
disabling an active one of the plurality of profiles;
disabling one or more applications associated with the disabled profile, wherein after being disabled, the one or more applications associated with the disabled profile are prevented from interacting with the respective mobile network;
enabling a different one of the plurality of profiles; and
enabling one or more of the plurality of applications associated with the enabled profile.

11. The method of claim 10, wherein the virtualized execution environment is a Java Card runtime environment and wherein at least one of the applications is a Java Card applet.

12. The method of claim 10, further comprising:
wherein said disabling the one or more applications associated with the disabled profile comprises sending a first command to a terminal coupled to the card computing device, wherein the first command comprises information identifying one or more menu entries for the applications being disabled and indicating that the one or more menu entries should be disabled; and
wherein said enabling the one or more of the plurality of applications associated with the activated profile comprises sending a second command to the terminal coupled to the card computing device, wherein the second command comprises information identifying one or more menu entries for the applications being enabled and indicating that the one or more menu entries should be enabled.

13. The method of claim 12, further comprising:
receiving, from the terminal, information indicating a user-selected menu entry, wherein the received information indicates a selected one of the one or more enabled menu entries; and
forwarding the received information to one of the enabled application associated with the selected one of the one or more enabled menu entries.

14. The method of claim 10, further comprising:
wherein said disabling the one or more applications associated with the disabled profile comprises sending a first command to a terminal coupled to the card computing device, wherein the first command comprises information identifying one or more application events for the applications being disabled and indicating that the one or more application events should be disabled; and
wherein said enabling the one or more of the plurality of applications associated with the activated profile comprises sending a second command to the terminal coupled to the card computing device, wherein the second command comprises information identifying one or more application events for the applications being enabled and indicating that the one or more application events should be disabled.

15. The method of claim 10, wherein at least one of the one or more of the plurality of applications is configured to communicate with a contactless interface of the card computing device, wherein said enabling the one or more of the plurality of applications associated with the activated profile comprises enabling one or more contactless parameters regarding the at least one of the one or more of the plurality of applications.

16. The method of claim 15, wherein said enabling the one or more of the plurality of applications associated with the activated profile comprises issuing one or more commands over a Host Controller Interface (HCI) link to a Near Field Communications (NFC) module to publish the contactless parameters to one or more external Proximity Payment System Environment (PPSE) applications.

17. A non-transitory, computer-readable storage medium storing program instructions that when executed on a card computing device cause the card computing device to perform:
maintaining, by a virtualized execution environment on the card computing device, a plurality of profiles, wherein each profile represents a subscriber identity module for a mobile network operator of a mobile network, wherein the virtualized execution environment is configured to execute a plurality of applications written in a platform independent object oriented language, wherein individual ones of the plurality of applications are associated with respective profiles of the plurality of profiles;
disabling an active one of the plurality of profiles;
disabling one or more applications associated with the disabled profile, wherein after being disabled, the one or more applications associated with the disabled profile are prevented from interacting with the respective mobile network;
enabling a different one of the plurality of profiles; and
enabling one or more of the plurality of applications associated with the enabled profile.

18. The non-transitory, computer-readable storage medium of claim 17, wherein the program instructions further cause the card computing device to perform:
downloading an additional profile from a mobile network operator; and
storing the additional profile on the card computing device.

19. The non-transitory, computer-readable storage medium of claim 18, wherein the program instructions further cause the card computing device to perform:
storing information regarding a plurality of applications associated with the additional profile in an information registry of the card computing device.

20. The non-transitory, computer-readable storage medium of claim 18, wherein the program instructions further cause the card computing device to perform:
enabling the additional profile; and
enabling one or more of the plurality of applications associated with the additional profile.

* * * * *

UNITED STATES PATENT AND TRADEMARK OFFICE
CERTIFICATE OF CORRECTION

PATENT NO. : 9,843,674 B2  
APPLICATION NO. : 14/495382  
DATED : December 12, 2017  
INVENTOR(S) : Hans Page 1 of 1

It is certified that error appears in the above-identified patent and that said Letters Patent is hereby corrected as shown below:

In the Drawings

On sheet 6 of 7, in FIG. 6, under Reference Numeral 620, Line 1, delete "entires" and insert -- entries --, therefor.

In the Specification

In Column 5, Line 46, delete "a the" and insert -- a --, therefor.

In Column 15, Line 30, delete "HCl" and insert -- HCI --, therefor.

In Column 17, Line 18, delete "(HCl)" and insert -- (HCI) --, therefor.

In Column 17, Line 22, delete "HCl" and insert -- HCI --, therefor.

In Column 17, Line 63, delete "(HCl)" and insert -- (HCI) --, therefor.

In the Claims

In Column 22, Line 7, in Claim 16, delete "(HCl)" and insert -- (HCI) --, therefor.

Signed and Sealed this  
Third Day of July, 2018

Andrei Iancu  
*Director of the United States Patent and Trademark Office*